(12) United States Patent
Martin

(10) Patent No.: US 8,997,560 B2
(45) Date of Patent: Apr. 7, 2015

(54) METHOD FOR SYNCHRONISING MEASUREMENTS

(75) Inventor: Denis Martin, Clermont-Ferrand (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 682 days.

(21) Appl. No.: 13/264,979

(22) PCT Filed: Apr. 14, 2010

(86) PCT No.: PCT/EP2010/054895
§ 371 (c)(1),
(2), (4) Date: Jan. 3, 2012

(87) PCT Pub. No.: WO2010/119066
PCT Pub. Date: Oct. 21, 2010

(65) Prior Publication Data
US 2012/0111089 A1    May 10, 2012

(30) Foreign Application Priority Data
Apr. 17, 2009  (FR) ...................... 09 52518

(51) Int. Cl.
*G01M 17/02* (2006.01)
*B60C 23/00* (2006.01)
*B60C 23/04* (2006.01)

(52) U.S. Cl.
CPC .................................. *B60C 23/0408* (2013.01)

(58) Field of Classification Search
None
See application file for complete search history.

(56) References Cited

U.S. PATENT DOCUMENTS

| 5,913,240 | A | * | 6/1999 | Drahne et al. ................... 73/146 |
| 6,032,520 | A | * | 3/2000 | Miyazaki ................... 73/115.07 |
| 7,119,670 | B2 | * | 10/2006 | Hammerschmidt .......... 340/447 |
| 7,121,138 | B2 | * | 10/2006 | Hammerschmidt ......... 73/146.3 |
| 7,173,521 | B2 | * | 2/2007 | Yamazaki ....................... 340/442 |
| 7,343,790 | B2 | * | 3/2008 | Hammerschmidt ......... 73/146.3 |
| 7,511,609 | B2 | * | 3/2009 | Hammerschmidt .......... 340/447 |
| 8,392,048 | B2 | * | 3/2013 | Colarelli et al. ............. 701/29.1 |
| 8,742,915 | B2 | * | 6/2014 | Vassilieff ...................... 340/447 |
| 2001/0002451 | A1 | * | 5/2001 | Breed ............................. 701/36 |
| 2006/0052987 | A1 | | 3/2006 | Katsuki et al. |
| 2006/0195233 | A1 | | 8/2006 | Ogawa et al. |

FOREIGN PATENT DOCUMENTS

| EP | 1 842 699 | 10/2007 |
| JP | 06-103482 | 4/1994 |
| JP | 07-257119 | 10/1995 |
| JP | 2001-052280 | 2/2001 |
| JP | 2005-100100 | 4/2005 |
| JP | 2005-525567 | 8/2005 |
| JP | 2006-085680 | 3/2006 |
| JP | 2006-272995 | 10/2006 |
| WO | WO 2005/030498 | 4/2005 |

* cited by examiner

Primary Examiner — Peter Macchiarolo
Assistant Examiner — Jermaine Jenkins
(74) Attorney, Agent, or Firm — Cozen O'Connor

(57) ABSTRACT

A method for synchronizing the measurements obtained, over a given period, from a number of measurement acquisition means for acquiring measurements of characteristics associated with the stresses withstood by a tire fitted on a running vehicle. The measurement acquisition means are brought into operation independently of one another and at least one indexing at a given instant of the measurements from each of said means is created relative to a time-measuring reference means.

8 Claims, 2 Drawing Sheets

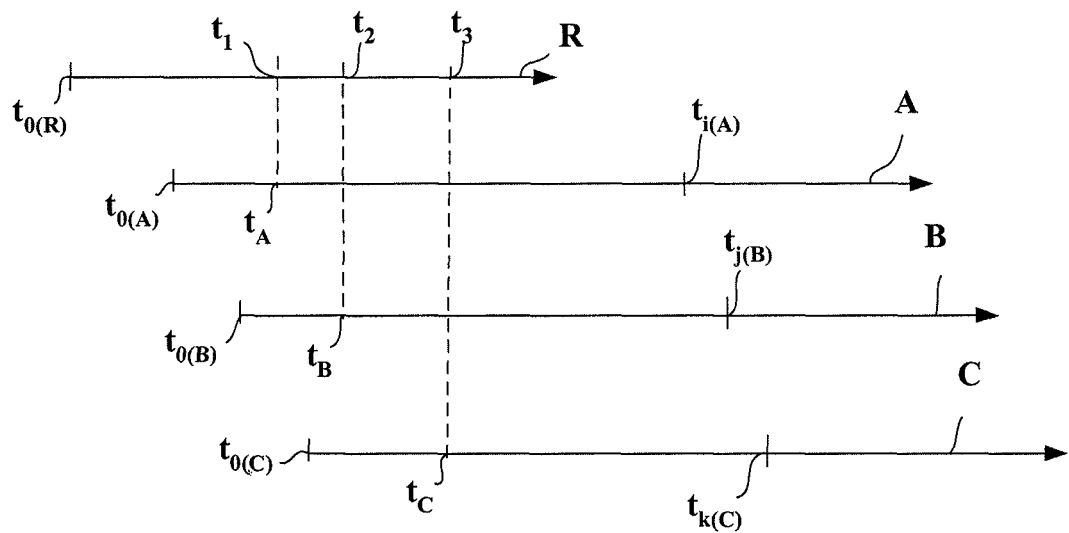
Fig. 2
Fig. 3
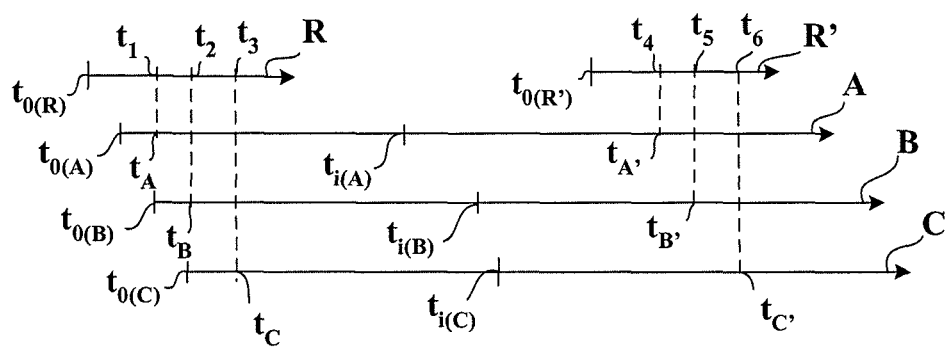

METHOD FOR SYNCHRONISING MEASUREMENTS

RELATED APPLICATIONS

This is a U.S. national stage under 35 USC §371 of application No. PCT/EP2010/054895, filed on Apr. 14, 2010.

This application claims the priority of French application Ser. No. 09/52518 filed Apr. 17, 2009, the entire content of which is hereby incorporated by reference.

The invention relates to a method for synchronizing the measurements obtained from a number of acquisition means for acquiring, over a given period, measurements associated with the stresses withstood by a tire fitted on a running vehicle, such as a vehicle intended to carry heavy loads.

BACKGROUND OF THE INVENTION

Although not limited to this type of vehicle, the invention will be more particularly described with reference to vehicles of the "civil engineering" type, for example dumpers intended for mining use. It notably concerns vehicles that may be required to run at the maximum of their capabilities and thus travel permanently within a mine for mine productivity reasons.

These vehicles usually comprise a steering front axle system comprising two steering wheels and a rear axle system, more often rigid, comprising four drive wheels divided into pairs on each side. An axle system is defined as a set of elements for linking the fixed structure of the vehicle to the ground.

In the case of these vehicles, notably intended for uses in mines or quarries for transporting loads, access difficulties and efficiency requirements are leading the manufacturers of these vehicles to increase their load capacity. It follows that the vehicles are increasingly large and therefore themselves increasingly heavy and can transport an increasingly heavy load. The current weights of these vehicles can be as high as several hundred tonnes and the same applies for the load to be transported; the overall weight can be as high as 600 tonnes.

Since the load capacity of the vehicle is directly linked to that of the tires, the design of the tires must be adapted to these trends to provide tires capable of withstanding the usage stresses.

The dimensions of these tires are therefore large. Consequently, the dimensions of the wheels are also large and the stiffness of the bottom regions of the tires is such that said wheels have to be made in several parts to enable the tire to be fitted onto a rim. The fitting and removal of the tires that take place during replacement or servicing involve long and tedious handling operations. The number of fastening parts that have to be handled during these operations may be greater than 200, and then there are the associated very significant tightening torques for these parts. These operations therefore take a long time which is detrimental to the productivity sought in the work of operating these mines.

With the current demand always geared towards increasing the load capacity of these vehicles, the various parameters mentioned previously are leading the designers of tires to optimize said tires, notably by taking into account their use.

To meet the demand of the users who want an even greater increase in the load capacity of the carrier vehicles, used notably in mines, it is necessary to improve the efficiency of the tires.

For this, it may be necessary to temporarily associate measurement means for measuring characteristics associated with the stresses withstood by a tire fitted on a running vehicle; these are characteristics measured directly on the tire and/or characteristics influencing the stresses that the tire withstands when the vehicle is running. These measurement means will make it possible to follow what the tires fitted on such vehicles undergo, and thus enable the designers of tires to be able to better adapt the tires to the real-life uses and meet the demands of the users, notably in terms of transported load capacity.

Such measurement means are, for example, means for measuring pressure and temperature, means measuring speeds, accelerations, and so on.

Since these measurement means are put in place temporarily and the down times of the vehicles are detrimental to productivity, they are designed to be easily and rapidly fitted or removed.

For this, they are also advantageously designed to be of modest sizes and weights so as to be easily transportable.

They are also designed to operate autonomously and therefore for each to have an associated energy source.

This energy source, in order to further limit the weight, is reduced to the maximum from the mass and bulk point of view and consequently is limited in terms of power.

The temporary association of measurement means for measuring characteristics associated with the stresses withstood by a tire fitted on a running vehicle consequently dictates measurement means which, on the one hand, are not linked together or even to an energy source by wired links in order to simplify the transportation, the fitting and then the removal of said measurement means; indeed, it is essential to limit the down times of the vehicles and therefore provide for installation and dismantling that are as simple and rapid as possible. On the other hand, it dictates an absence of communication between the measurement means by wireless links and therefore by waves, such communication techniques being heavy consumers of energy. It is also difficult to design a roaming system that operates on the principle of communication by radio waves, bearing in mind that this type of communication means is regulated and that the rules, and more particularly the frequencies, may vary from one country to another.

In the present case, the desire to obtain data relating to the stresses undergone by the tire necessitates a plurality of measurement means in order to obtain information that is as comprehensive as possible. It is also necessary, for the analysis of such data, to be able to combine all the measurements and therefore synchronize them.

SUMMARY OF THE INVENTION

One object of the invention is to make it possible to analyze measurements obtained by a number of measurement acquisition means for acquiring measurements of characteristics associated with the stresses withstood by a tire fitted on a running vehicle, said measurement means not being linked together or to any other system and the measurement acquisition means being limited in terms of weight, bulk and energy consumption as explained previously.

This object has been achieved according to one aspect of the invention directed to a method for synchronizing the measurements obtained, over a given period, from a number of measurement acquisition means for acquiring measurements of characteristics associated with the stresses withstood by a tire fitted on a running vehicle, said measurement acquisition means being brought into operation independently of one another and at least one indexing at a given instant of the measurements from each of said means being created relative to a time-measuring reference means.

According to an embodiment of the invention, the time-measuring reference means serves as a reference for creating an index on each of the signals recorded over time by a measurement acquisition means. The inventors were able to reveal that the use of a single time-measuring benchmark combined with the creation of an index on each of the signals allows for a synchronization of the various signals obtained by each of the measurement acquisition means. Indeed, it is thus possible to position in time the obtaining of a measurement by one of the acquisition means relative to a time origin specific to the time-measuring reference means. This operation, when repeated for the various signals, makes it possible to synchronize them and thus allow for an analysis of all said signals and for their combination to better define the stresses withstood by the tires and possibly explain these stresses.

Advantageously according to an embodiment of the invention, outside of said at least one indexing at a given instant, the measurement acquisition means are continually independent of one another and said means acquire measurements autonomously.

According to this advantageous embodiment of the invention, the measurement acquisition means are totally independent of one another and autonomous, except possibly during said at least one indexing at a given instant of each of the acquisition means. Since said acquisition means do not have to communicate with one another or with any other device, their energy consumption remains limited and it is therefore also not necessary for them to be associated with or linked to a significant energy source.

According to an embodiment of the invention, the reference means is one of the measurement means.

According to a another embodiment of the invention, the reference means is an independent additional means. This embodiment may make it possible to simplify the implementation of the method. Indeed, an operator can thus have a time-measuring reference means and create an index on each of the acquisition means either by direct connection or by transmitting a signal, said acquisition means being designed to receive this information. This reference means is a device comprising a clock associated with an energy source capable of powering it during the period required for the indexing of the various measurement means and comprising a communication system designed to dialogue with the various measurement means. The communication can take place either by connection, for example, with a plug-in connector which allows for an exchange of information, or by waves, the measurement means then acting only as a receiver, which requires only a small contribution of energy. For example, such a reference means may be a computer or else a PDA (personal digital assistant) equipped with an RS232 link.

Advantageously according to an embodiment of the invention, the indexing at a given instant of the measurements from each of said means is done with a time offset relative to the other means. The invention in fact provides for the possibility of not creating an index simultaneously on each of the signals produced by the different acquisition means. The method according to the invention thus provides for the possibility of indexing the acquisition means one after the other, the latter having already begun their respective measurement acquisitions. Each of the signals is then synchronized relative to the time measured by the reference means until its own indexing, said signals then being easily synchronized with one another for their analysis.

A variant of the invention provides for each of the measurements to be corrected by taking into account the temporal drift of the acquisition means concerned. It is in fact known that the time-measuring devices may exhibit a drift in time. Since such drifts are variable from one acquisition means to another, when the acquisitions are done over long durations, they may disrupt the analysis of the signals obtained despite the proposed synchronization. The invention thus proposes to correct the drifts of each of the acquisition means before performing the synchronization according to the invention. For this, it is necessary to define the drift of each of the acquisition means by a preliminary study and perform a processing of the signal obtained to eliminate the effect due to that drift. The definition and correction of the temporal drift are performed by any means known to those skilled in the art. For example, the influence of temperature is determined first by running each measurement means through an oven and can be modelled by a third degree polynomial.

In order to obviate the temporal drift phenomena of the various acquisition means, it is also possible to limit the signal acquisition period to a time that is sufficiently short for the various drifts to be negligible. Measurements over a longer duration but performed at a constant temperature will also make it possible to obviate these temporal drift phenomena.

According to a preferred embodiment of the invention, it is also possible to create an indexing at a given instant at the start of the measurements of each of said means relative to the time-measuring reference means and an indexing at a given instant at the end of the measurements of each of said means relative to the time-measuring reference means. This embodiment of the invention will make it possible to perform a double synchronization, at the start and end of acquisition of the signals, which may make it possible, if the acquisition period corresponds to temporal drift phenomena that are not negligible, to obviate the latter, at least on average.

For even longer acquisition periods, the invention also advantageously provides for the creation of an indexing at a given instant at regular intervals, during the given period, of the measurements of each of said means relative to the time-measuring reference means. Such a variant embodiment of the invention will result in multiple synchronizations, the number thereof being defined by the necessary signal acquisition duration, making it possible to obviate the temporal drift phenomena of the various acquisition means.

According to other embodiments of the invention, it is also possible to combine multiple indexings of measurements of each of said means relative to the time-measuring reference means and to correct each of the measurements by taking into account the temporal drift of the acquisition means concerned.

The abovementioned measurement means may, according to the invention, be of any type and are designed for measurements of characteristics associated with the stresses withstood by a tire fitted on a running vehicle.

The measured characteristics may first of all be those directly associated with a tire such as its pressure or its temperature. There may also be characteristics directly associated with the vehicle such as, for example, the load, the distance travelled, the direction taken, the inclination of the vehicle either in the form of pitch or in the form of roll, and so on, which have an influence on, or may influence, the stresses that the tires fitted on the vehicle undergo.

There may also be characteristics associated with its environment such as the temperature, the nature of the ground, etc., which may vary during the use of the tires and which have an influence on the behavior of a tire.

In fact, such usage characteristics which are associated either with the conditions of use or with the mode of use have a direct influence on the stresses undergone by a given tire of the vehicle.

The slope of the lane or track followed by the vehicle will notably modify the distribution of the loads for each tire. A vehicle running in the downhill direction causes, for example, a transfer of loads to the front axle system whereas the same vehicle running in the uphill direction will result in a transfer of load to the rear axle system of the vehicle.

Similarly, a twisting path will result in distributions of loads that vary between the left and the right of the vehicle depending on the directions of the curves taken by the vehicle. Turns to the right or to the left effectively modify the load distributions between the tires.

Some environmental parameters which may be considered as conditions of use of the vehicle and therefore of the tires may modify the stresses withstood by said tires.

The temperature, for example, acts on the behavior of the tire and therefore on its reactions to stresses that are imposed on it. The nature of the ground, whether it is, for example, a cobbly terrain or even a sandy or argillaceous terrain, directly affects the stresses on the tire.

The measurement means are, for example, pressure sensors directly associated with the tires or else linked to the suspension systems of the vehicle, temperature sensors, means for measuring speeds, accelerations, GPS-type devices, and so on.

Each of the measurement means is, according to the invention, on the one hand associated with an energy source to enable it to operate and, on the other hand to memory elements for storing the measurements acquired during the measurement period.

BRIEF DESCRIPTION OF THE DRAWINGS

Other advantageous details and characteristics of the invention will emerge hereinbelow from the description of exemplary embodiments of the invention with reference to FIGS. 1 to 3 which represent.

Figure 1:
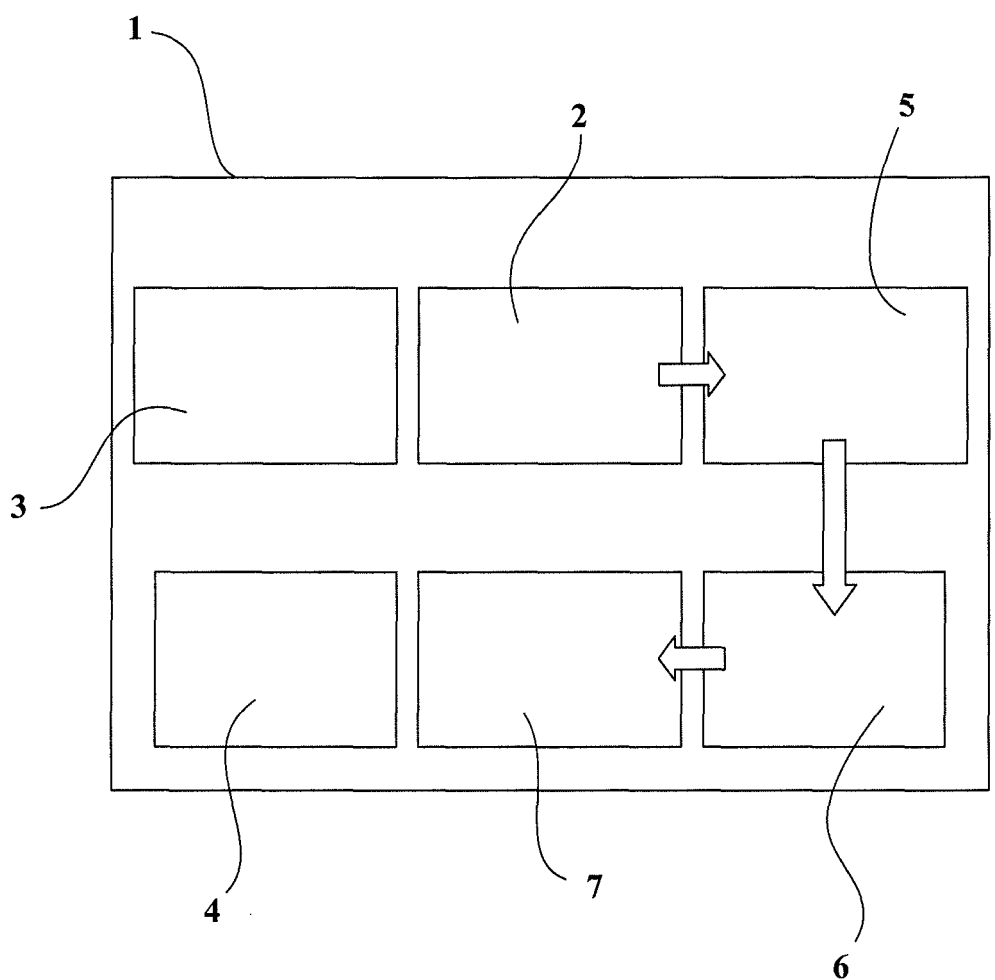
FIG. 1, a schematic representation of a measurement acquisition means for implementing the invention, FIG. 2, a schematic representation of a first embodiment of the invention for synchronizing measurements, FIG. 3, a schematic representation of a second embodiment of the invention for synchronizing measurements.

The examples described hereinbelow involved performing measurements on a dumper-type vehicle, equipped with six tires of type 59/80R63, travelling on the tracks of an open-cast mine.

DETAILED DESCRIPTION OF THE DRAWINGS

The various measurement acquisition means used were as follows:
- Six gauge-bridge pressure sensors, each associated with a tire fitted on the vehicle for measuring the pressure of each of the tires; this type of sensor allows for measurements from 0 to 10 bar.
- Four gauge-bridge pressure sensors for measuring the suspension pressures; this type of sensor allows for measurements of 0 to 300 bar.
- Four ultrasound rangefinders associated with the chassis, for measuring the distance between the chassis and ground; this type of sensor allows for measurements of 0 to 3 meters.
- Two MEMS (micro electro-mechanical systems) accelerometers for measuring lateral and longitudinal accelerations.

FIG. 1 schematically illustrates the device or module 1 fixed to the tire or the vehicle incorporating one of these sensors 2. On this module 1, the sensor 2 is first of all associated with a battery providing its autonomy and a clock 4. The measurements obtained by the sensor pass through a conditioning cell 5 which amplifies and filters the signal corresponding to the measurement to be stored by a microprocessor 6 in a memory unit 7 for storing the duly treated measurements.

All of these sensors and modules first of all offer the advantage of consisting of a limited volume enabling them to be transported simply, for example in a suitcase that can easily be transported by air and routed to a site such as a mine.

This advantage is considerable in as much as the subject is a mobile device which has to be able to be transported from one site to another and returned for analysis of the results.

Then, all of these sensors were able to be installed on the vehicle in a relatively short time, of around 1 hour. Such a time makes it possible to best limit the down time of the vehicle.

After having been installed on the vehicle, each of the sensors is brought into operation manually and begins recording measurements.

The device includes an additional element equipped with a clock which will be used to index the measurements of each of the sensors. This additional element is a simple computer which creates an index on the measurements of each of the sensors by RS232 connection.

FIG. 2 schematically illustrates the synchronization of the measurements of three sensors at the start of the measurements. The additional element represented by the time scale R measures the time and is used to create indexings on the measurements of three sensors illustrated by the time scales A, B, C. On each of these scales there is a starting point corresponding to the starting up of the sensors and therefore to the start of acquisition of the measurements by each of them. These starting points are indicated by the times $t_{0(A)}$, $t_{0(B)}$ and $t_{0(C)}$ respectively corresponding to each of the time scales A, B, C.

After the sensors are started up, indexings are created from the additional element. These indexings are illustrated on the time scales A, B, C by the times $t_A$, $t_B$, $t_C$ measured by on the respective time scales A, B, C of each of the sensors and respectively corresponding to the times $t_1$, $t_2$, $t_3$ measured on the time scale R.

A time $t_{i(A)}$ measured on the time scale A and corresponding to the measurement signal from the sensor A can then be corrected with a view to synchronization of the measurement of the sensor A with those of the other sensors as follows:

$$t_{i(A)\,corrected} = t_{i(A)} - t_A + t_1$$

Similarly, the following applies:

$$T_{i(B)\,corrected} = t_{i(B)} - t_B + t_2, \text{ and}$$

$$T_{i(C)\,corrected} = t_{i(C)} - t_C + t_3$$

As explained previously, when the measurements are performed over a duration such that the temporal drifts of the sensors become non-negligible, the corrected value may incorporate a drift factor $d_x$ defined beforehand for each of the sensors.

The corrected values are then expressed as follows:

$$t_{i(x)\,corrected} = (t_{i(x)} - t_x) \cdot d_x + t_u$$

with u varying from 1 to 3.

It is also possible to obviate the temporal drift phenomena of the sensors by creating periodic indexings on each of the measurements of the sensors and to correct the values according to these various indexings.

FIG. 3 schematically illustrates a second indexing of the different time scales.

A first possibility of use of a second or of an nth indexing is to perform the same computation as explained previously while assuming that, between each indexing, the temporal drift is negligible. The corrected values can then, for example, be expressed in the form:

$$T_{j(x)\ corrected} = t_{j(x)} - t_x + t_y,$$

with v varying from 4 to 6 for example in FIG. 3.

Similarly, it is also possible to take account of the temporal drift and the formula is then written:

$$T_{j(x)\ corrected} = (t_{j(x)} - t_x) \cdot d_x + t_y$$

Another possibility, in the case of FIG. 3, is to use two successive indexings to determine a temporal drift factor of one sensor relative to the other by taking one of the sensors as a reference or, more specifically, its time scale. The determination of such a factor will make it possible to halve the synchronization error due to the temporal drift of the sensors.

In the case where the sensor A is chosen as the reference, we then obtain corrected values which are expressed as follows:

$$t_{i(A)\ corrected} = t_{i(A)} - t_A + t_1,$$

$$T_{i(B)\ corrected} = [(t_A - t_4 + t_5) - (t_A - t_1 + t_2)]/(t_B - t_B) \times (t_{i(B)} - t_B) + t_2, \text{ and}$$

$$T_{i(C)\ corrected} = [(t_A - t_4 + t_6) - (t_A - t_1 + t_3)]/(t_C - t_C) \times (t_{i(C)} - t_C) + t_3$$

The two formulae $[(t_A - t_4 + t_5) - (t_A - t_1 + t_2)]/(t_B - t_B)$ and $[(t_A - t_4 + t_6) - (t_A - t_1 + t_3)]/(t_C - t_C)$ are respectively the temporal drift factors of the sensors corresponding to the time scales B and C relative to the sensor corresponding to the time scale A.

One of the sensors has been taken as a reference but it is also possible to use an abstract reference such as, for example, a reference corresponding to the average of all the sensors.

According to this last synchronization mode, it is also possible to take account of the temporal drifts of each of the sensors by determining the latter first and including them in the formulae for correcting the various values.

The invention thus proposes, also as explained previously, combining the effects of a number of indexings and the taking into account of the temporal drifts of each of the sensors for the correction of the measured values in order to perform the synchronization of the various measurements.

Two types of measurements were performed. The first consisted in performing an acquisition over a period of around one hour, a period during which the temporal drift phenomena of the sensors are negligible when it comes to the desired interpretation of the measurements. The synchronization between the various measurements was done by simply indexing the measurements at the start of the period which allows for a correction of the values as explained previously. Such a type of measurement is of interest to certain cases because it will correspond to one cycle in the repetitive use of the vehicle. It makes it possible to give indications on certain usage parameters.

The second consisted in performing an acquisition over a period of around twenty hours, a period during which the temporal drift phenomena of the sensors can no longer be disregarded. The synchronization of the various measurements was then done by the combination of a number of indexings of measurements and more specifically every eight hours associated with the taking into account of the temporal drift factors of each of the sensors. This type of measurement gives a more significant view of the stresses undergone by the tire in the use of the vehicle, since all of the parameters that can influence the experience of the tires are then encountered; factors that are then notably taken into account are factors such as changes of driver, changes in driving between day time and night time, etc.

The invention claimed is:

1. A method for synchronizing the measurements obtained, over a given period, from a number of measurement acquisition means for acquiring measurements of characteristics associated with the stresses withstood by a tire fitted on a running vehicle, wherein the measurement acquisition means are brought into operation independently of one another, wherein at least one indexing at a given instant of the measurements from each of said means is created relative to a time-measuring reference means, and wherein each of the measurements is corrected by taking into account the temporal drift of the acquisition means concerned.

2. The method according to claim 1, wherein, outside of said at least one indexing at a given instant, the measurement acquisition means are continually independent of one another and said means acquire measurements autonomously.

3. The method according to claim 1, wherein the reference means is one of the measurement means.

4. The method according to claim 1, wherein the reference means is an independent additional means.

5. The method according to claim 1, wherein the indexing at a given instant of the measurements from each of said means is done with a time offset relative to the other means.

6. The method according to claim 1, wherein an indexing at a given instant at the start of the measurements of each of said means is created relative to the time-measuring reference means and an indexing at a given instant at the end of the measurements of each of said means is created relative to the time-measuring reference means.

7. The method according to claim 1, wherein an indexing at a given instant at regular intervals, during the given period, of the measurements of each of said means is created relative to the time-measuring reference means.

8. The method according to claim 1, wherein each measurement acquisition means is associated with a clock, with memory elements and with an energy source.

* * * * *